United States Patent
Wang et al.

(10) Patent No.: US 10,818,924 B2
(45) Date of Patent: Oct. 27, 2020

(54) POSITIVE ELECTRODE PLATE, PREPARATION METHOD THEREOF AND SODIUM-ION BATTERY

(71) Applicant: CONTEMPORARY AMPEREX TECHNOLOGY CO., LIMITED, Ningde (CN)

(72) Inventors: Ying Wang, Ningde (CN); Yongsheng Guo, Ningde (CN); Chengdu Liang, Ningde (CN); Xiqing Wang, Ningde (CN); Shuojian Su, Ningde (CN); Qian Liu, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 73 days.

(21) Appl. No.: 16/152,205

(22) Filed: Oct. 4, 2018

(65) Prior Publication Data
US 2019/0131625 A1    May 2, 2019

(30) Foreign Application Priority Data
Oct. 30, 2017 (CN) .............. 201711042638

(51) Int. Cl.
| H01M 4/00 | (2006.01) |
| H01M 4/58 | (2010.01) |
| H01M 4/136 | (2010.01) |
| H01M 4/1397 | (2010.01) |
| H01M 10/054 | (2010.01) |
| H01M 4/04 | (2006.01) |
| H01M 4/62 | (2006.01) |
| H01M 4/02 | (2006.01) |

(52) U.S. Cl.
CPC ....... H01M 4/5825 (2013.01); H01M 4/0404 (2013.01); H01M 4/0471 (2013.01); H01M 4/136 (2013.01); H01M 4/1397 (2013.01); H01M 4/58 (2013.01); H01M 4/622 (2013.01); H01M 4/625 (2013.01); H01M 10/054 (2013.01); H01M 2004/021 (2013.01); H01M 2004/028 (2013.01)

(58) Field of Classification Search
CPC ......... H01M 4/5825; H01M 2004/021; H01M 2004/028; H01M 4/136
See application file for complete search history.

(56) References Cited

U.S. PATENT DOCUMENTS

| 2013/0257378 A1* | 10/2013 | Lu ................ H01M 4/136 |
| | | 320/128 |
| 2014/0335409 A1 | 11/2014 | Wang et al. |
| 2015/0243987 A1 | 8/2015 | Lu et al. |
| 2016/0248100 A1* | 8/2016 | Joo ................ H01M 4/8647 |

FOREIGN PATENT DOCUMENTS

| CN | 106960956 A | 7/2017 |
| KR | 20170098529 A | 8/2017 |

OTHER PUBLICATIONS

Contemporary Amperex Technology Co., Limited, Extended European Search Report EP18199351.0, dated Nov. 16, 2018, 7 pgs.
Contemporary Amperex Technology Co., Limited, First Office Action, CN201711042638.1, dated Jun. 11, 2020, 6 pgs.
NIU Junting et al., "Impact of Water Content on the Performance of LiFePO4 Based Lithium-Ion Battery", Oct. 2015, Journal of Electrochemistry, vol. 21, No. 5, Electrochem.2015. 21(5): 465-470, Shanghai Jiao Tong University, 6 pgs.

* cited by examiner

Primary Examiner — Cynthia H Kelly
Assistant Examiner — Monique M Wills
(74) Attorney, Agent, or Firm — Morgan, Lewis & Bockius LLP

(57) ABSTRACT

The present disclosure provides a positive electrode plate, a preparation method thereof and a sodium-ion battery. The positive electrode plate comprises a positive electrode current collector and a positive electrode active material film. The positive electrode active material film provided on the positive electrode current collector and comprises a positive electrode active material. The positive electrode active material comprises a prussian blue analogue material, a molecular formula of the prussian blue analogue material is $A_xM[M'(CN)_6]_y$, a water content of the positive electrode active material film is 100 µg/g~5000 µg/g. The water content of the positive electrode active material film is controlled within a certain range, which can not only ensure the sodium-ion battery do not seriously swell during charge-discharge process, but also can ensure sodium-ion battery have excellent charge-discharge performance and cycle performance.

19 Claims, No Drawings

POSITIVE ELECTRODE PLATE, PREPARATION METHOD THEREOF AND SODIUM-ION BATTERY

CROSS-REFERENCE TO RELATED APPLICATIONS

The present application claims priority to Chinese patent application No. CN201711042638.1, filed on Oct. 30, 2017, which is incorporated herein by reference in its entirety.

FIELD OF THE PRESENT DISCLOSURE

The present disclosure relates to the field of battery, and more specifically relates to a positive electrode plate, a preparation method thereof and a sodium-ion battery.

BACKGROUND OF THE PRESENT DISCLOSURE

With the development of human society, energy issues have drawn increasing attention. Traditional fossil fuels pollute the environment and are not renewable; the lead-acid battery is low in cost, but raw materials of the lead-acid battery mainly are lead and sulfuric acid, so that the lead-acid battery has problems such as easy to pollute the environment, short lifetime and memory effect; the lithium-ion battery has advantages such as high energy density, long service life and no memory effect, but the reserves of lithium raw material is limited, and the cost of lithium-ion battery is high, in the long run, the lithium-ion battery cannot meet the requirements of large-scale energy storage. Compared with the lithium-ion battery, the sodium-ion battery is widely concerned because of its rich raw material resources, good safety performance, high energy density, low cost, environmental friendliness and the like. Currently, the main problem of the sodium-ion battery is its poor electrochemical performance, and the positive electrode plate of sodium-ion battery has a significant influence on the electrochemical performance.

In view of the above, the present disclosure is proposed.

SUMMARY OF THE PRESENT DISCLOSURE

In view of the problem existing in the background, an object of the present disclosure is to provide a positive electrode plate, a preparation method thereof and a sodium-ion battery, which not only can significantly improve gas production of the sodium-ion battery, but also can make the sodium-ion battery have excellent charge-discharge performance and cycle performance.

In order to achieve the above object, in a first aspect of the present disclosure, the present disclosure provides a positive electrode plate, which comprises a positive electrode current collector and a positive electrode active material film. The positive electrode active material film provided on the positive electrode current collector and comprises a positive electrode active material. The positive electrode active material comprises a prussian blue analogue material, a molecular formula of the prussian blue analogue material is $A_xM[M'(CN)_6]_y$, where, A is one or more selected from a group consisting of alkali metal ion and alkaline-earth metal ion, M is a transition metal, M' is a transition metal, $0<x\leq2$, $0<y<1$, a water content of the positive electrode active material film is 100 µg/g~5000 µg/g.

In a second aspect of the present disclosure, the present disclosure provides a preparation method of a positive electrode plate, for preparing the positive electrode plate according to the first aspect of the present disclosure, which comprises steps of: (1) fully mixing the prussian blue analogue material with the molecular formula of $A_xM[M'(CN)_6]_y$, which is prepared in advance, a conductive agent, a binder and a solvent and obtaining a positive electrode slurry; (2) coating the positive electrode slurry which is obtained in the step (1) on a positive electrode current collector, after drying and cold-pressing, obtaining an initial positive electrode plate; (3) drying the initial positive electrode plate obtained in step (2) under vacuum, and controlling a water content of the positive electrode active material film to be 100 µg/g~5000 µg/g, and obtaining a positive electrode plate.

In a third aspect of the present disclosure, the present disclosure provides a sodium-ion battery, which comprises the positive electrode plate according to the first aspect of the disclosure.

Compared to the technologies in the background, the present disclosure has the following beneficial effects: the positive electrode plate of the present disclosure comprises a prussian blue analogue material, and the water content of the positive electrode active material film is controlled to be 100 µg/g~5000 µg/g, which can not only ensure that the water of the positive electrode active material film will not be electrolyzed during charge-discharge process, and probability of side reactions between the water of the positive electrode active material film and an electrolyte is low, so that the sodium-ion battery will not seriously swell during charge-discharge process, and charge-discharge process can be normally performed, but also can prevent structure of the prussian blue analogue material from collapsing due to a coordinated water in crystal structure of the prussian blue analogue material being dried out, so that the sodium-ion battery has excellent charge-discharge performance and cycle performance. In addition, the positive electrode plate can be achieved in a simple process and is suitable for large scale production

DETAILED DESCRIPTION

Hereinafter a positive electrode plate, a preparation method thereof and a sodium-ion battery according to the present disclosure are described in detail.

Firstly, a positive electrode plate according to a first aspect of the present disclosure is described.

A positive electrode plate according to a first aspect of the present disclosure comprises a positive electrode current collector and a positive electrode active material film. The positive electrode active material film provided on the positive electrode current collector and comprises a positive electrode active material. The positive electrode active material comprises a prussian blue analogue material, a molecular formula of the prussian blue analogue material is $A_xM[M'(CN)_6]_y$, where, A is one or more selected from a group consisting of alkali metal ion and alkaline-earth metal ion, M is a transition metal, M' is a transition metal, $0<x\leq2$, $0<y<1$, a water content of the positive electrode active material film is 100 µg/g~5000 µg/g. that means the water content corresponding to per gram of the positive electrode active material film is 100 µg~5000 µg.

In the positive electrode plate according to the first aspect of the present disclosure, the prussian blue analogue material itself has strong hygroscopicity and large specific surface area, so that the prussian blue analogue material can adsorb a large amounts of water molecules in the environment during preparation process of the positive electrode slurry and the positive electrode plate. The water molecules can be electrolyzed to generate hydrogen during charge-discharge process of the sodium-ion battery, so that charge-discharge process of the sodium-ion battery cannot be normally performed due to swelling. And also side reactions will occur between the water molecules and the electrolyte, on one hand, a solid side reaction product generated will deposit on a surface of each of the positive electrode active material film and a negative electrode active material film, resulting in difficulty in intercalation-deintercalation of sodium ions, decreasing capacity of the sodium-ion battery and weakening cycle performance of the sodium-ion battery; on the other hand, a gas side reaction product generated (such as HF) will corrode a passive film on the surface of each of the positive electrode active material film and the negative electrode active material film, and will corrode the positive electrode active material and the negative electrode active material, which will make the positive electrode active material and the negative electrode active material expose to the electrolyte and the exposed positive electrode active material and negative electrode active material continuously react with the electrolyte to form a new passive film, so that the sodium ions are continuously consumed, which will decrease capacity of the sodium-ion battery and influence cycle performance of the sodium-ion battery. However, a coordinated water contained in the prussian blue analogue material plays an important role in supporting the crystal structure of the prussian blue analogue material, if the positive electrode active material film does not contain water or has too low content of water, this means the coordinated water is released from the crystal structure of the prussian blue analogue material, the crystal structure of the prussian blue analogue material will collapse, so that active sites which the sodium ions can intercalate-deintercalate during charge-discharge process will be decreased, thereby influencing capacity and cycle performance of the sodium-ion battery. Therefore when the water content of the positive electrode active material film of the present disclosure is controlled to be an appropriate range (100 μg/g~5000 μg/g), it cannot only significantly improve gas production of the sodium-ion battery, but also can make the sodium-ion battery has excellent charge-discharge performance and cycle performance without influencing capacity.

It should be noted that, the water of the positive electrode active material film mainly comprises the coordinated water and an interstitial water located in the crystal structure of the prussian blue analogue material and a water (herein collectively referred to as an adsorbed water) adsorbed on a surface of a prussian blue analogue material particle and located between the prussian blue analogue material particles.

In the positive electrode plate according to the first aspect of the present disclosure, preferably, A is one or more selected from a group consisting of $Li^+$, $Na^+$, $K^+$, $Mg^{2+}$ and $Ca^{2+}$, further preferably, A is one or two selected from a group consisting of $Na^+$ and $K^+$.

In the positive electrode plate according to the first aspect of the present disclosure, preferably, M is one selected from a group consisting of Mn, Fe, Co, Ni, Cu, Zn, V and Cr.

In the positive electrode plate according to the first aspect of the present disclosure, preferably, M' is one selected from a group consisting of Mn, Fe, Co, Ni, Cu, Zn, V and Cr.

In the positive electrode plate according to the first aspect of the present disclosure, preferably, the water content of the positive electrode active material film is 300 μg/g~3000 μg/g, in this range, gas production of the sodium-ion battery can be further improved, the sodium-ion battery has excellent charge-discharge performance and cycle performance without influencing capacity.

In the positive electrode plate according to the first aspect of the present disclosure, if a specific surface area of a particle of the positive electrode active material particle ("the particle of the positive electrode active material particle" can be alternatively expressed as "the positive electrode active material particle" for sake of brevity) is too small, the electrolyte has poor infiltrating performance of the positive electrode active material particle, and the diffusion path of the sodium ions in the positive electrode active material particle is too long, which is not beneficial to capacity and rate performance of the sodium-ion battery, if the specific surface area of the positive electrode active material particle is too large, the positive electrode plate is more easier to adsorb water molecules in the air or in the electrolyte during preparation process of the positive electrode plate, and the water content of the positive electrode plate will be increased, thus will not beneficial to performance of the sodium-ion battery. Preferably, the specific surface area of the positive electrode active material (that is the specific surface area of the positive electrode active material particle) is 5 $m^2/g$~20 $m^2/g$.

In the positive electrode plate according to the first aspect of the present disclosure, the positive electrode active material film may further comprise a conductive agent. A type of the conductive agent is not particularly limited and may be selected according to actual demand. Specifically, the conductive agent is one or more selected from a group consisting of conductive carbon black, conductive graphite, carbon nanotube and carbon nanofiber.

In the positive electrode plate according to the first aspect of the present disclosure, the positive electrode active material film may further comprise a binder. A type of the binder is not particularly limited and may be selected according to actual demand. Specifically, the binder is one or more selected from a group consisting of oil-soluble binder and water-soluble binder. The oil-soluble binder is one or more selected from a group consisting of polyvinylidene fluoride binder, where, the polyvinylidene fluoride binder comprises vinylidene fluoride monomer homopolymer and vinylidene fluoride monomer and other fluorovinylidene monomer copolymer. The vinylidene fluoride monomer and other fluorovinylidene monomer copolymer is one or more selected from a group consisting of vinylidene fluoride-hexafluoropropylene copolymer, vinylidene fluoride-trifluoroethylene copolymer, vinylidene fluoride-chlorotrifluoroethylene copolymer, vinylidene fluoride-tetrafluoro ethylene copolymer, vinylidene fluoride-trifluoroethylene-chlorofluoroethylene copolymer and tetrafluoro ethylene-hexafluoropropylene-vinylidene fluoride copolymer. The water-soluble binder is one or more selected from a group consisting of styrene butadiene rubber, sodium carboxymethylcellulose, sodium alginate, polyacrylic acid and polytetrafluoroethylene.

In the positive electrode plate according to the first aspect of the present disclosure, a type of the positive electrode current collector is not particularly limited and may be selected according to actual demand. Specifically, the positive electrode current collector is one selected from a group consisting of aluminum foil, porous aluminum foil, stainless steel foil and porous stainless steel foil.

Secondly, a preparation method of the positive electrode plate according to a second aspect of the present disclosure is described.

A preparation method of the positive electrode plate according to a second aspect of the present disclosure, for preparing the positive electrode plate according to the first aspect of the present disclosure, which comprises steps of: (1) fully mixing the prussian blue analogue material with the molecular formula of $A_xM[M'(CN)_6]_y$, which is prepared in advance, a conductive agent, a binder and a solvent and obtaining a positive electrode slurry; (2) coating the positive electrode slurry which is obtained in the step (1) on a positive electrode current collector, after drying and cold-pressing, obtaining an initial positive electrode plate; (3) drying the initial positive electrode plate obtained in step (2) under vacuum, and controlling a water content of the positive electrode active material film to be 100 μg/g~5000 μg/g, and obtaining a positive electrode plate.

In the preparation method of the positive electrode plate according to the second aspect of the present disclosure, in the step (2), a conventional drying process can be used to remove the solvent in the positive electrode slurry, a drying temperature is 80° C.~120° C., a drying time is usually shorter. For example, in a continuous production process of the positive electrode plate, the drying time is within 10 minutes.

In the preparation method of the positive electrode plate according to the second aspect of the present disclosure, in the step (3), if a temperature of the drying under vacuum is too low, even though drying is performed for long time, the water content of the positive electrode active material film cannot be effectively controlled, particularly, the adsorbed water adsorbed on the surface of the prussian blue analogue material particle and located between the prussian blue analogue material particles cannot be dried out; if the temperature of the drying under vacuum is too high, the binder of the positive electrode plate will partially lose efficacy, causing an irreversible damage of the positive electrode plate, thus influencing performance of the sodium-ion battery. Preferably, the temperature of the drying under vacuum is 85° C.~220° C.

In the preparation method of the positive electrode plate according to the second aspect of the present disclosure, in the step (3), if a vacuum degree of the drying under vacuum is too low, the water molecules which have been dried out may be re-adsorbed by the prussian blue analogue material and cannot effectively decrease the water content of the positive electrode active material film, or the drying under vacuum should be performed for long time, which will increase production cost. Preferably, the vacuum degree of the drying under vacuum is less than or equal to −0.07 MPa.

In the preparation method of the positive electrode plate according to the second aspect of the present disclosure, in the step (3), a time of the drying under vacuum is not limited and may be selected according to actual demand. For example, the drying under vacuum can be performed for a lower temperature and a longer time or a higher temperature and a shorter time, a lower vacuum degree and a longer time, or a higher vacuum degree and a shorter time. However, taking account of time saving and cost saving, preferably, the time of the drying under vacuum is 12 h~40 h.

Thirdly, a sodium-ion battery according to a third aspect of the present disclosure is described.

A sodium-ion battery according to a third aspect of the present disclosure comprises a positive electrode plate, a negative electrode plate, an electrolyte and a separator. Where, the positive electrode plate is the positive electrode plate according to the third aspect of the present disclosure.

In the sodium-ion battery, the negative electrode plate may comprise a negative electrode current collector and a negative electrode active material film containing a negative electrode active material and provided on the negative electrode current collector. The negative electrode active material may be one or more selected from a group consisting of carbon material, alloy material, transition metal oxide and sulfide, phosphorus base material and titanate material. Specifically, the carbon material may be one or more selected from a group consisting of hard carbon, soft carbon, amorphous carbon, nano structure carbon material; the alloy material may be an alloy material formed by one or more selected from a group consisting of Si, Ge, Sn, Pb and Sb; a general formula of the transition metal oxide and sulfide is $M_xN_y$, where M is one or more selected from a group consisting of Fe, Co, Ni, Cu, Mn, Sn, Mo, Sb and V, N is O or S; the phosphorus base material may be one or more selected from a group consisting of red phosphorus, white phosphorus and black phosphorus; the titanate material may be one or more selected from a group consisting of $Na_2Ti_3O_7$, $Na_2Ti_6O_{13}$, $Na_4Ti_5O_{12}$, $Li_4Ti_5O_{12}$ and $NaTi_2(PO_4)_3$.

In the sodium-ion battery, the negative electrode plate may further comprise a conductive agent and a binder, types of the conductive agent and the binder are not particularly limited and may be selected according to actual demand.

In the sodium-ion battery, the electrolyte may be a liquid electrolyte, the electrolyte may comprise a sodium salt, an organic solvent and an optional additive. A type of the sodium salt is not particularly limited and may be selected according to actual demand. Specifically, the sodium salt may be one or more selected from a group consisting of sodium hexafluorophosphate ($NaPF_6$), sodium perchlorate ($NaClO_4$), sodium hexafluoroborate ($NaBF_6$), sodium trifluoromethanesulfonate, sodium bis(trifluoromethanesulfonate) imide (NaTFSI). A type of the organic solvent is not particularly limited and may be selected according to actual demand. Specifically, the organic solvent may be one or more selected from a group consisting of ethylene carbonate (EC), propylene carbonate (PC), dimethyl carbonate (DMC), diethyl carbonate (DEC) and ethyl methyl carbonate (EMC). A type of the additive is not particularly limited and may be selected according to actual demand. Specifically, the additive may be one or more selected from a group consisting of fluoroethylene carbonate (FEC) and vinylene carbonate (VC).

In the sodium-ion battery, a material of the separator is not particularly limited and may be selected according to actual demand. Specifically, the separator may be one or more selected from a group consisting of polypropylene film, polyethylene film, polyethylene/polypropylene/polyethylene composite film, non-woven fabrics film and glass fibre film.

Hereinafter the present disclosure will be described in detail in combination with examples. It should be noted that, the examples described in the present disclosure are only used for explaining the present disclosure, and are not intended to limit the scope of the present disclosure.

Example 1

(1) Preparation of a positive electrode plate: $Na_2MnFe(CN)_6$ (prussian blue analogue material), a binder and a conductive agent at a mass ratio of 80:10:10 were uniformly mixed with a solvent and a positive electrode slurry was obtained (where, the binder was polyvinylidene fluoride (PVDF), the conductive agent was conductive carbon black, the solvent was 1-methyl-2-pyrrolidinone (NMP)); then the positive electrode slurry was coated on an aluminum foil (positive electrode current collector), after drying, cold-pressing and slitting, a positive electrode plate with a positive electrode active material film provided on the aluminum foil was obtained, where, a BET specific surface area of the prussian blue analogue material was 12 $m^2/g$, a water content of the positive electrode active material film was 100 μg/g.

(2) Preparation of a negative electrode plate: a negative electrode active material, a binder and a conductive agent at a mass ratio of 90:5:5 were uniformly mixed with a solvent and a negative electrode slurry was obtained (where, the negative electrode active material was hard carbon, the binder was butadiene styrene rubber (SBR), the conductive agent was conductive carbon black, the solvent was deionized water); then the negative electrode slurry was coated on a copper foil (negative electrode current collector), after drying, cold-pressing and slitting, a negative electrode plate was obtained.

(3) Preparation of an electrolyte: ethylene carbonate (EC) and dimethyl carbonate (DMC) at a volume ratio of 1:1 were mixed and a mixed organic solvent was obtained, then a fully dried $NaClO_4$ (sodium salt) was dissolved in the mixed organic solvent, an electrolyte was obtained, where, a concentration of the $NaClO_4$ was 1 mol/L.

(4) Preparation of a separator: a conventional polypropylene (PP) film was used as a separator.

(5) Preparation of a sodium-ion battery: the positive electrode plate, the negative electrode plate and the separator were wound and placed in a package case, then the electrolyte was injected, after forming, standing-by and the like, a sodium-ion battery was obtained.

Example 2

The preparation was the same as example 1, except that in the preparation of a positive electrode plate (step (1)), the water content of the positive electrode active material film was controlled to be 300 μg/g.

Example 3

The preparation was the same as example 1, except that in the preparation of a positive electrode plate (step (1)), the water content of the positive electrode active material film was controlled to be 1000 μg/g.

Example 4

The preparation was the same as example 1, except that in the preparation of a positive electrode plate (step (1)), a water content of the positive electrode active material film was controlled to be 2000 μg/g.

Example 5

The preparation was the same as example 1, except that in the preparation of a positive electrode plate (step (1)), the water content of the positive electrode active material film was controlled to be 3000 μg/g.

Example 6

The preparation was the same as example 1, except that in the preparation of a positive electrode plate (step (1)), the water content of the positive electrode active material film was controlled to be 4000 μg/g.

Example 7

The preparation was the same as example 1, except that in the preparation of a positive electrode plate (step (1)), the water content of the positive electrode active material film was 5000 μg/g.

Example 8

The preparation was the same as example 1, except that in the preparation of a positive electrode plate (step (1)), the prussian blue analogue material was $Na_2FeFe(CN)_6$, the water content of the positive electrode active material film was controlled to be 1000 μg/g.

Example 9

The preparation was the same as example 1, except that in the preparation of a positive electrode plate (step (1)), the prussian blue analogue material was $NaCoFe(CN)_6$, the water content of the positive electrode active material film was controlled to be 1000 μg/g.

Example 10

The preparation was the same as example 1, except that in the preparation of a positive electrode plate (step (1)), the BET specific surface area of the selected prussian blue analogue material was 5 $m^2/g$, the water content of the positive electrode active material film was controlled to be 1000 μg/g.

Example 11

The preparation was the same as example 1, except that in the preparation of a positive electrode plate (step (1)), the BET specific surface area of the selected prussian blue analogue material was 20 $m^2/g$, the water content of the positive electrode active material film was controlled to be 1000 μg/g.

Comparative Example 1

The preparation was the same as example 1, except that in the preparation of a positive electrode plate (step (1)), the water content of the positive electrode active material film was controlled to be 5500 μg/g.

Comparative Example 2

The preparation was the same as example 1, except that in the preparation of a positive electrode plate (step (1)), the water content of the positive electrode active material film was controlled to be 70 μg/g.

Comparative Example 3

The preparation was the same as example 1, except that in the preparation of a positive electrode plate (step (1)), the BET specific surface area of the selected prussian blue analogue material 2 $m^2/g$, the water content of the positive electrode active material film was controlled to be 1000 μg/g.

Comparative Example 4

The preparation was the same as example 1, except that in the preparation of a positive electrode plate (step (1)), the BET specific surface area of the selected prussian blue analogue material was 30 m²/g, the water content of the positive electrode active material film was controlled to be 1000 μg/g.

Finally, test processes of the sodium-ion batteries was described.

(1) Test of Water Content of the Positive Electrode Active Material Film

Karl Fischer Moisture Titrator was used to test the water content of the positive electrode film, test process was as follow: a positive electrode plate with a certain mass which baked in a vacuum oven was taken out, for ease of testing, a tablet punching machine with a diameter of 14 mm was used to punch a small round sample with a diameter of 14 mm, the mass of the small round sample was marked as M1 (generally the mass of the sample was 0.2 g~1 g), then an aluminum foil (positive electrode current collector) with the same area was taken, the mass of the aluminum foil was marked as M2, the sampling process was usually performed in a drying room. The dried small round sample of the positive electrode plate was sealed in a penicillin bottle, and the water content of the corresponding positive electrode plate was tested by a Karl Fischer Moisture Titrator and marked as P1 (Karl Fischer Moisture Titrator increased temperature to 170° C.).

Water content $P$ of the positive electrode film (μg/g) $=P1/(M1-M2)$.

It should be noted that the water content measured was the total water content of the positive electrode film, which comprised the coordinated water and the interstitial water in the prussian blue analogue material crystal structure, and also comprised the adsorbed water adsorbed on the surface of the prussian blue analogue material particle and located between the prussian blue analogue material particles.

(2) Test of Cycle Performance of the Sodium-Ion Battery

At 25° C., four sodium-ion batteries of examples 1-11 and four sodium-ion batteries of comparative examples 1-4 were respectively taken to perform charge-discharge cycle test. Test process was as follow: the sodium-ion battery was charged to voltage of 4.0V at a constant current of 1 C, then the sodium-ion battery was charged to a current of 0.2 C at a constant voltage of 4.0V, next standing-by was performed for 5 min, then the sodium-ion battery was discharged to a voltage of 1.9V at a constant current of 1 C, and standing-by was performed for 5 min again, this was a charging-discharging cycle process, the discharged capacity this time was marked as discharged capacity of the first cycle of the sodium-ion battery. Then the charge-discharge cycle of the sodium-ion battery was performed for 100 times, discharged capacity of $100^{th}$ cycle of the sodium-ion battery was marked.

Capacity retention rate after $100^{th}$ cycle of the sodium-ion battery (%)=(Discharged capacity of $100^{th}$ cycle of the sodium-ion battery/Discharged capacity of the first cycle of the sodium-ion battery)×100%.

TABLE 1

Test results of examples 1-11 and comparative examples 1-4

| | Positive electrode active material | BET specific surface area of the Positive electrode active material (m²/g) | Water content (μg/g) | Discharged capacity of the first cycle (mAh) | Capacity retention rate after $100^{th}$ cycle |
|---|---|---|---|---|---|
| Example 1 | Na₂MnFe(CN)₆ | 12 | 100 | 850 | 87% |
| Example 2 | Na₂MnFe(CN)₆ | 12 | 300 | 880 | 91% |
| Example 3 | Na₂MnFe(CN)₆ | 12 | 1000 | 900 | 93% |
| Example 4 | Na₂MnFe(CN)₆ | 12 | 2000 | 870 | 90% |
| Example 5 | Na₂MnFe(CN)₆ | 12 | 3000 | 860 | 89% |
| Example 6 | Na₂MnFe(CN)₆ | 12 | 4000 | 840 | 85% |
| Example 7 | Na₂MnFe(CN)₆ | 12 | 5000 | 800 | 82% |
| Example 8 | Na₂FeFe(CN)₆ | 12 | 1000 | 700 | 90% |
| Example 9 | NaCoFe(CN)₆ | 12 | 1000 | 800 | 92% |
| Example 10 | Na₂MnFe(CN)₆ | 5 | 1000 | 860 | 89% |
| Example 11 | Na₂MnFe(CN)₆ | 20 | 1000 | 850 | 87% |
| Comparative example 1 | Na₂MnFe(CN)₆ | 12 | 5500 | 750 | 75% |
| Comparative example 2 | Na₂MnFe(CN)₆ | 12 | 70 | 830 | 83% |
| Comparative example 3 | Na₂MnFe(CN)₆ | 2 | 1000 | 830 | 84% |
| Comparative example 4 | Na₂MnFe(CN)₆ | 30 | 1000 | 820 | 83% |

When the water content of the positive electrode active material film was controlled in an appropriate range, for example in examples 1-7, the sodium-ion battery had excellent discharged capacity of the first cycle and excellent cycle performance. In comparative example 2, the water content of the positive electrode active material film was too low, discharged capacity of the first cycle of the sodium-ion battery was very low, and cycle performance of the sodium-ion battery was poor, the reason was that, when the water content of the positive electrode active material film was too low, that means the coordinated water inside of the crystal structure of the prussian blue analogue material had been dried out, which would cause the crystal structure of the prussian blue analogue material to collapse, intercalation-deintercalation of some sodium ions could not performed, as a result, discharged capacity of the first cycle of the sodium-ion battery was low, meanwhile the collapse of the crystal structure of the prussian blue analogue material was not beneficial to the conduction of the sodium ions, therefore cycle performance of the sodium-ion battery would be decreased. When the water content of the positive electrode active material film was too large, for example in comparative example 1, discharged capacity of the first cycle and cycle performance of the sodium-ion battery were also poor, the reason was that, when the water content of the positive electrode active material film was too large, side reactions would occur among the adsorbed water and the interstitial water which were not removed in positive electrode plate and the electrolyte during charge-discharge process, which would consume active sodium ions and decrease discharged capacity of the first cycle of the sodium-ion battery, meanwhile the solid side reaction product would coat the surface of the positive electrode plate and cause the polarization to increase, while the gas side reaction product (such as HF) would corrode the positive electrode active material and decrease discharged capacity of the first cycle of the sodium-ion battery, in addition, the water in the positive electrode active material film may further be electrolyzed to generate hydrogen and cause swelling, which would damage interfaces of the positive electrode and the negative electrode, and further deteriorate cycle performance of the sodium-ion battery.

It could be shown from example 3 and examples 8-9, since different types of the prussian blue analogue material had similar structure, thus controlling the water content of the positive electrode active material film to be an appropriate range could make the sodium-ion battery have excellent discharged capacity of the first cycle and cycle performance, but it should be noted that, the different number of sodium ions contained in the prussian blue analogue material would result in slightly difference of its performance, therefore the improvement of discharged capacity of the first cycle and cycle performance of the sodium-ion battery were slightly different, this was a normal phenomenon, and it was not related to water content.

In example 3 and examples 10-11, when controlling the specific surface area of the prussian blue analogue material to be an appropriate range, the sodium-ion battery had excellent discharged capacity of the first cycle and cycle performance. In comparative example 3, the specific surface area of the prussian blue analogue material was too small, which was not beneficial to the electrolyte to infiltrate the positive electrode plate, so that the intercalation-deintercalation speed of sodium ions in the positive electrode active material were slower and the diffusion path was longer, so discharged capacity of the first cycle and cycle performance of the sodium-ion battery were poor. In comparative example 4, the specific surface area of the prussian blue analogue material was too large, the passive film formed on the surface of the positive electrode would consume more sodium ions, thus discharged capacity of the first cycle of the sodium-ion battery was low; meanwhile, if the specific surface area was too large, more adsorbed water would exist in the prussian blue analogue material, a longer time would be needed to dry the positive electrode plate, which was not beneficial to produce; in addition, due to the large framework of the prussian blue analogue material, the prussian blue analogue material had strong adsorbability, when the specific surface area was too large, water could be dried out from particles or hole in the particle itself, and the prussian blue analogue material would adsorb the side reaction products during charge-discharge process, which would block sodium ion diffusion path, and deteriorated discharged capacity of the first cycle and cycle performance of the sodium-ion battery. Therefore, preferably, the specific surface area of the positive electrode active material was controlled to be 5 $m^2/g$~20 $m^2/g$.

In conclusion, the water content of the positive electrode active material film of the present disclosure was controlled to be a certain range, which not only could ensure that the water would not be electrolyzed during the charge-discharge process, and the probability of side reactions between the water and the electrolyte was low, so that the sodium-ion battery would not seriously swell and charge-discharge cycle can be normally performed, but also could prevent the crystal structure from collapsing due to that the coordinated water in the crystal structure of the prussian blue analogue material was dried out, and avoid rapidly decreasing of capacity of the sodium-ion battery, so that the sodium-ion battery had excellent charge-discharge performance and cycle performance.

What is claimed is:

1. A positive electrode plate, comprising:
   a positive electrode current collector; and
   a positive electrode active material film provided on the positive electrode current collector and comprising a positive electrode active material;
   wherein,
   the positive electrode active material comprises a Prussian blue analogue material, a molecular formula of the Prussian blue analogue material is $A_xM[M'(CN)_6]_y$, where, A is one or more selected from a group consisting of alkali metal ion and alkaline-earth metal ion, M is a transition metal, M' is a transition metal, $0<x\leq2$, $0<y<1$;
   a water content of the positive electrode active material film is 100 µg/g~5000 µg/g.

2. The positive electrode plate according to claim 1, wherein
   A is one or more selected from a group consisting of $Li^+$, $Na^+$, $K^+$, $Mg^+$ and $Ca^{2+}$;
   M is one selected from a group consisting of Mn, Fe, Co, Ni, Cu, Zn, V and Cr;
   M' is one selected from a group consisting of Mn, Fe, Co, Ni, Cu, Zn, V and Cr.

3. The positive electrode plate according to claim 2, wherein A is one or two selected from a group consisting of $Na^+$ and $K^+$.

4. The positive electrode plate according to claim 1, wherein the water content of the positive electrode active material film is 300 µg/g~3000 µg/g.

5. The positive electrode plate according to claim 1, wherein the positive electrode active material film further comprises a conductive agent, the conductive agent is one or more selected from a group consisting of conductive carbon black, conductive graphite, carbon nanotube and carbon nanofiber.

6. The positive electrode plate according to claim 1, wherein the positive electrode active material film further comprises a binder, the binder is one or more selected from a group consisting of polyvinylidene fluoride binder, styrene butadiene rubber, sodium carboxymethylcellulose, sodium alginate, polyacrylic acid and polytetrafluoroethylene.

7. The positive electrode plate according to claim 5, wherein the positive electrode active material film further comprises a binder, the binder is one or more selected from a group consisting of polyvinylidene fluoride binder, styrene butadiene rubber, sodium carboxymethylcellulose, sodium alginate, polyacrylic acid and polytetrafluoroethylene.

8. The positive electrode plate according to claim 1, wherein a specific surface area of the positive electrode active material is 5 $m^2/g$~20 $m^2/g$.

9. A preparation method of a positive electrode plate comprising steps of:
   (1) fully mixing a Prussian blue analogue material with a molecular formula of $A_xM[M'(CN)_6]_y$ which is prepared in advance, a conductive agent, a binder and a solvent and obtaining a positive electrode slurry, where, A is one or more selected from a group consisting of alkali metal ion and alkaline-earth metal ion, M is a transition metal, M' is a transition metal, $0<x\leq2$, $0<y<1$;

(2) coating the positive electrode slurry which is obtained in the step (1) on a positive electrode current collector, after drying and cold-pressing, obtaining an initial positive electrode plate;

(3) drying the initial positive electrode plate obtained in step (2) under vacuum, and controlling a water content of the positive electrode active material film to be 100 μg/g~5000 μg/g, and obtaining a positive electrode plate.

10. The preparation method of the positive electrode plate according to claim 9, wherein in the step (3), a vacuum degree of the drying under vacuum is less than or equal to −0.07 MPa.

11. The preparation method of the positive electrode plate according to claim 9, wherein in the step (3), a temperature of the drying under vacuum is 85° C. ~220° C.

12. A sodium-ion battery, comprising a positive electrode plate, the positive electrode plate comprising a positive electrode current collector and a positive electrode active material film, the positive electrode active material film being provided on the positive electrode current collector and comprising a positive electrode active material; wherein, the positive electrode active material comprises a Prussian blue analogue material, a molecular formula of the Prussian blue analogue material is $A_xM[M'(CN)_6]_y$, where, A is one or more selected from a group consisting of alkali metal ion and alkaline-earth metal ion, M is a transition metal, M' is a transition metal, $0<x\leq2$, $0<y<1$;

a water content of the positive electrode active material film is 100 μg/g~5000 μg/g.

13. The sodium-ion battery according to claim 12, wherein

A is one or more selected from a group consisting of $Li^+$, $Na^+$, $K^+$, $Mg^+$ and $Ca^{2+}$;

M is one selected from a group consisting of Mn, Fe, Co, Ni, Cu, Zn, V and Cr;

M' is one selected from a group consisting of Mn, Fe, Co, Ni, Cu, Zn, V and Cr.

14. The sodium-ion battery according to claim 13, wherein A is one or two selected from a group consisting of $Na^+$ and $K^+$.

15. The sodium-ion battery according to claim 12, wherein the water content of the positive electrode active material film is 300 μg/g~3000 μg/g.

16. The sodium-ion battery according to claim 12, wherein the positive electrode active material film further comprises a conductive agent, the conductive agent is one or more selected from a group consisting of conductive carbon black, conductive graphite, carbon nanotube and carbon nanofiber.

17. The sodium-ion battery according to claim 12, wherein the positive electrode active material film further comprises a binder, the binder is one or more selected from a group consisting of polyvinylidene fluoride binder, styrene butadiene rubber, sodium carboxymethylcellulose, sodium alginate, polyacrylic acid and polytetrafluoroethylene.

18. The sodium-ion battery according to claim 16, wherein the positive electrode active material film further comprises a binder, the binder is one or more selected from a group consisting of polyvinylidene fluoride binder, styrene butadiene rubber, sodium carboxymethylcellulose, sodium alginate, polyacrylic acid and polytetrafluoroethylene.

19. The sodium-ion battery according to claim 12, wherein a specific surface area of the positive electrode active material is 5 m²/g~20 m²/g.

* * * * *